United States Patent [19]

Margolin

[11] Patent Number: 4,762,391

[45] Date of Patent: Aug. 9, 1988

[54] GRAPHIC INPUT DEVICE AND METHOD INCLUDING A FIBER OPTIC BUNDLE WITH ELECTRONIC MEANS FOR IMPROVING IMAGES

[75] Inventor: George Margolin, Newport Beach, Calif.

[73] Assignee: Photon Devices, Ltd., Newport Beach, Calif.

[21] Appl. No.: 894,792

[22] Filed: Aug. 8, 1986

Related U.S. Application Data

[63] Continuation-in-part of Ser. No. 581,085, Feb. 17, 1986, Pat. No. 4,674,834.

[51] Int. Cl.[4] ............... G02B 6/06; H01J 5/16; G09G 1/02
[52] U.S. Cl. .................... 350/96.25; 350/96.24; 350/96.29; 350/320; 250/227; 358/901; 340/789; 340/798; 340/799
[58] Field of Search ........... 350/96.10, 96.24, 96.25, 350/96.26, 96.27, 96.29, 96.28, 320; 355/1; 250/227; 340/789, 794, 795, 797, 798, 799, 793; 358/901

[56] References Cited

U.S. PATENT DOCUMENTS

| | | | |
|---|---|---|---|
| 4,441,817 | 4/1984 | Pryor | 250/227 X |
| 4,521,771 | 6/1985 | Alton | 340/793 X |
| 4,549,175 | 10/1985 | Rokunoke et al. | 340/794 |
| 4,570,063 | 2/1986 | De Bie et al. | 250/227 |
| 4,674,834 | 6/1987 | Margolin | 350/96.25 |
| 4,677,683 | 6/1987 | Pfred, III et al. | 250/227 X |
| 4,702,552 | 10/1987 | Margolin | 350/96.25 |

Primary Examiner—William L. Sikes
Assistant Examiner—Brian M. Healy
Attorney, Agent, or Firm—Marmorek, Guttman & Rubenstein

[57] ABSTRACT

An optical fiber bundle having a coherent, partially coherent, or non-coherent fiber array is made to exhibit an improved image. The output end of the bundle is abutted against or imaged upon an array of sensors. A beam of light having a diameter small compared to the fiber diameter is moved along a path in a manner to traverse the entire input face of the bundle during an initialization procedure. During the initializing procedure radiation exits from consecutive fibers in positions which correspond to one or more sensors of the array. The addresses of those sensors are determined in each instance and stored to be used during later scanner operations to interrogate the sensor array in an address sequence corresponding to the input end positions of the fibers thus associating the spatial relationship of sensors with corresponding fiber inputs. The arrangement permits even a non-coherent fiber optic bundle to produce a coherent image and a coherent or partially coherent fiber optic bundle to produce an improved image.

17 Claims, 6 Drawing Sheets

GRAPHIC INPUT DEVICE AND METHOD INCLUDING A FIBER OPTIC BUNDLE WITH ELECTRONIC MEANS FOR IMPROVING IMAGES

CROSS REFERENCE TO COPENDING APPLICATION

The present application is a continuation-in-part of copending application Ser. No. 581,085, filed Feb. 17, 1986, now U.S. Pat. No. 4,674,834, and assigned to the assignee of the present application. This prior patent application is incorporated herein by reference.

FIELD OF THE INVENTION

This invention relates to a graphic input device employing a coherent fiber optic bundle operative to apply a group of pixels to an electronic sensor array.

BACKGROUND OF THE INVENTION

It is well known to employ a coherent fiber optic bundle to apply a group of pixels to a sensor array. Such a system employs a fiber for each sensor and requires the attachment (or imaging) of a fiber onto the associated sensor in order to achieve a defect-free image. For large numbers of fibers, particularly when the fibers have very small diameters, the attachment of the fibers to the associated sensors is tedious, difficult, and expensive to achieve.

The above-mentioned copending application discloses a technique not only for achieving a coherent image from a fiber optic bundle, but also by doing so with a non-coherent bundle and by doing it in a manner which eliminates the need for associating each fiber with a corresponding sensor or for predetermining its position ahead of time. Instead, the output end of the fiber optic bundle is associated with a sensor array without regard to the spatial relationship of the fibers and the sensors of the array. But the fiber diameter is chosen to be large compared to the size of a sensor or the fiber exit end is imaged onto the sensor array in a manner to correspond to a plurality of sensors.

An initializing arrangement is used to determine which sensors correspond to a particular fiber of the bundle wherever that fiber may be located in the bundle. The initializing arrangement is adapted to move a beam of radiation incrementally along a path in the input face of the array in a manner to intersect the fibers in an ordered sequence. The beam is incremented along the path such as to intersect the fiber ends and the sensor array is interrogated, in each instance, to determine which sensors are illuminated each time the beam is moved. Because the beam diameter is relatively small, there is no need to move the beam accurately to the precise positions of consecutive fibers in the input face. In this manner, a non-coherent fiber optic bundle is made to provide a coherent image electronically in a simple and inexpensive manner.

The present invention is based on the recognition that the initializing arrangement can be made to serve a benefit for coherent fiber optic bundles as well as non-coherent fiber optic bundles when used as an input to a random access, electronically addressed readout, implemented with a CCD, CID, optic RAM chip, or Vidicon technology. The problems that arise with respect to coherent optical fiber bundles have to do primarily with a mismatch between the diameter or shape of a fiber in the bundle and the size, shape, and/or location of the sensors of the array. The transmitted image is acceptable only as long as the fiber diameter equals the size and location of the sensor to which it is attached. But if a mismatch occurs in size or location, the group of pixels transmitted by the fiber bundle can cause the image to be degraded significantly. Not only is important information lost, but, in addition, many degrading artifacts may occur, such as aliasing and moire patterns.

BRIEF DESCRIPTION OF THE INVENTION

The initializing arrangement disclosed in the above-identified copending application is used herein in conjunction with a coherent fiber optic array permissibly with fibers mismatched in size and/or location imaged onto or abutting an electronic sensor array. The initializing arrangement is employed exactly as disclosed in that copending application to generate a subset of addresses of sensors of the sensor array interrogated during each scan period. Thus, the input ends of fibers of a coherent fiber bundle are associated with the addresses of sensors interrogated so that the image scanned can be reconstructed in the sequence determined during the initialization procedure. Superior images are achieved in spite of any mismatch. The invention is particularly useful in industrial and medical scope applications where high resolution requires large numbers of minuscule fibers even when the sensors of the sensor array are spaced apart relatively farther than are the fibers and the input face of the fiber bundle is imaged onto the sensor array.

Initializing apparatus for moving a relatively small beam of light incrementally along a path in an input face of a fiber optic bundle to intersect the fiber ends one by one and the determination of a corresponding sensor of a sensor away coupled to the output face of the bundle is considered to represent a considerable departure from prior art thinking. The use of such apparatus particularly for initializing already coherent fiber optic bundles is also thought to represent a significant departure from prior art thinking.

DETAILED DESCRIPTION

Figure 1:
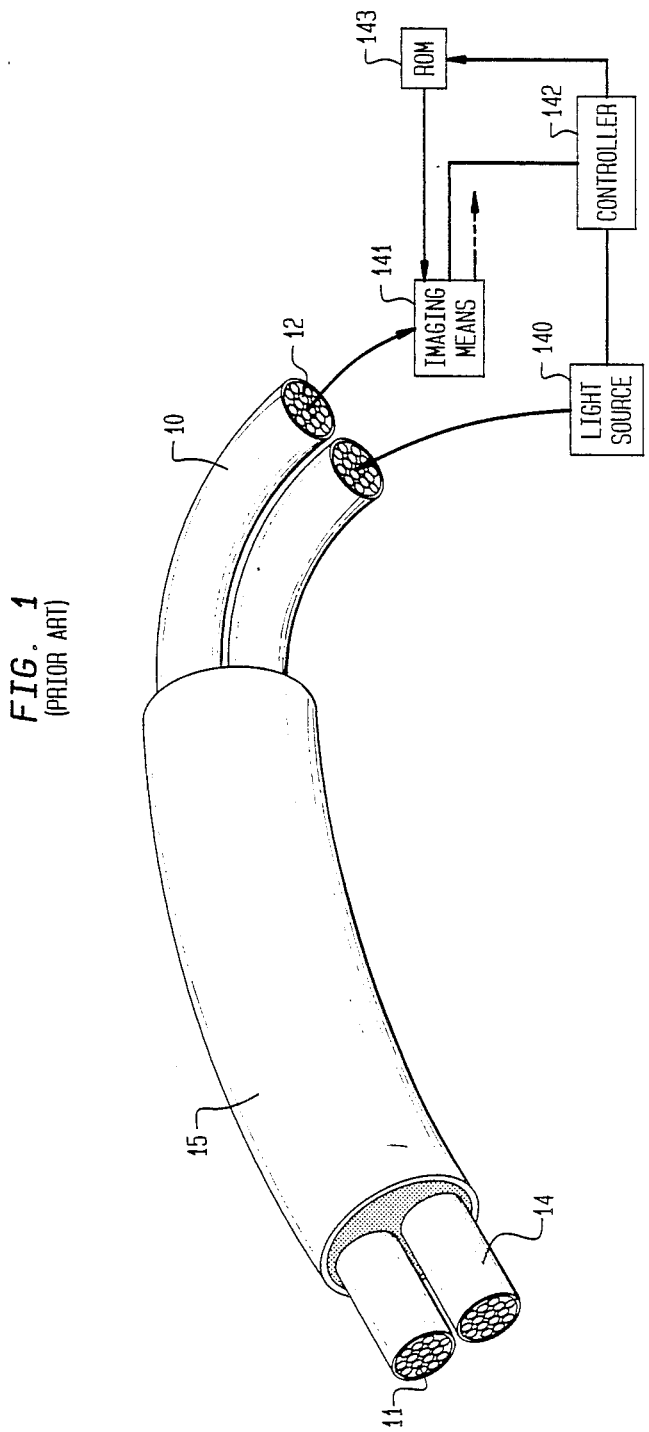
FIG. 1 is a perspective view, partially cut away, of a scope for use in industrial or medical applications.

FIG. 1 shows an optical fiber bundle 10 which has an input end 11 and an output end 12. The optical bundle is intended for use in a medical or industrial scope for examining inaccessible areas. The optical bundle is used in conjunction with a second optical bundle 14 (normally used for illumination), the two optical bundles being encased in a flexible tube 15 which may include apparatus for manipulating the input end in a manner to follow a tortuous path, the entirety representing a medical or industrial scope. Such scopes are commercially available.

Commercial scopes typically are adapted at the output end for viewing through an eyepiece. When they are adapted for capturing an image electronically, a poor image is obtained in the absence of costly and time consuming image enhancement.

The reason for the poor image has to do with the physical characteristics of the sensor array adapted for capturing the image, the "coherent" character of the fiber array and the mismatch between fiber size and spacing and sensor size and spacing. The poor image also occurs because of different sensitivities of the sensors and different transmission characteristics of the fibers. In truth, a prior art coherent fiber bundle is seldom, if ever, really coherent, particularly for electronic image taking, unless a very costly one to one correspondence between each fiber and its associated sensor is fixed physically.

Figure 2:
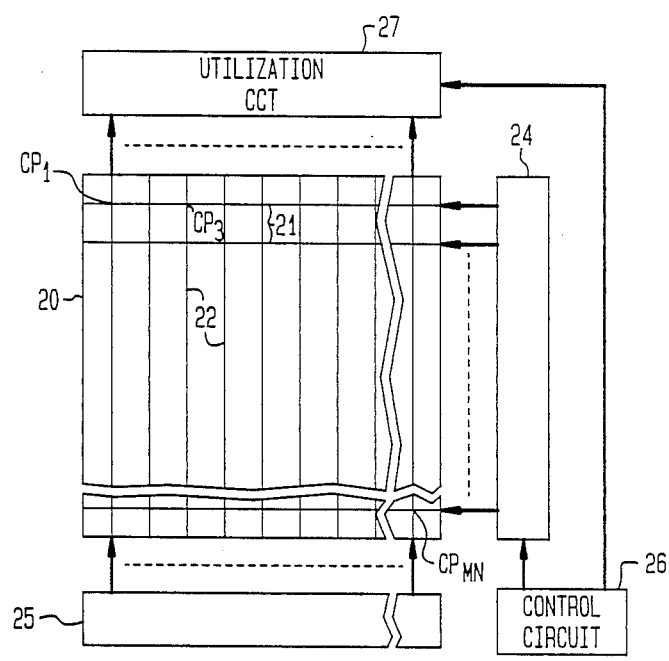
FIG. 2 is a schematic top view of a random access memory adapted for use as a sensor array with the scope of FIG. 1 in accordance with the principle of this invention.

FIG. 2 shows a schematic illustration of a sensor array 20 useful in accordance with the principles of the present invention. The sensor array is shown organized as a standard random access memory, but could be a charge-coupled device (CCD) organized as a random-access device, a similarly organized charge-injected device (CID), or any other suitable random access sensor array. The sensor array includes x and y conductors, 21 and 22 respectively, which define cross points where they intersect. The cross points are designated $CP_1$, $CP_2$, ... $CP_{MN}$, for an M row by N column array and are taken to represent individual sensors. The row conductors are connected to an x-address generator 24 and the column conductors are connected to a y-address generator 25. The address generators are controlled by a control circuit 26. In operation, using common sensors, all the sensors of the array may be thought of as pre-charged (or discharged) during one cycle of operation and the amount of incident radiation determines the amount of charge remaining (or acquired) when a read cycle next occurs. The readout signals are applied to a utilization circuit 27 in a well understood manner.

Figure 3:
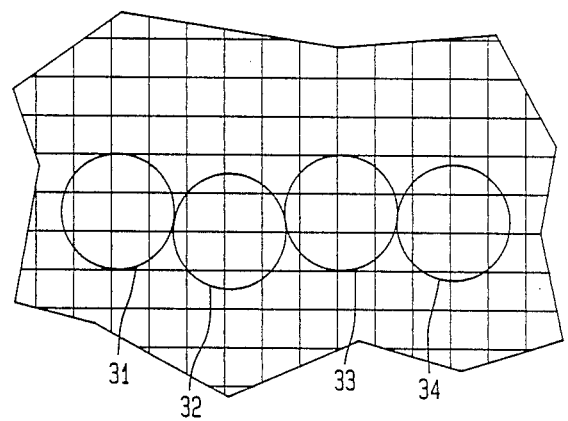
FIG. 3 is a schematic top view of the memory of FIG. 2 with the ends of a few of the fibers of FIG. 1 superimposed thereon.

FIG. 3 is a schematic representation of a portion of array 20. The sensors are shown in squares in FIG. 3, the sensor arrays typically being constructed so that the sensors occupy virtually the entire area of the array. Consider what happens when the fibers of bundle 10 abut the sensor array. A typical case is illustrated by superimposing illustrative fibers of a fragment of bundle 10 onto the array as represented by circles (fibers) 31, 32, 33, and 34 in FIG. 3. This case illustrates a simple misalignment between a line of fibers in the bundle and a row of sensors where the fiber size is taken as about two and one half times the size of a sensor diagonal. It can be seen that fiber 31 illuminates twelve sensors fully or partially, fiber 32 illuminates fourteen, fiber 33 illuminates twelve, fiber 34 illuminates eleven sensors. Such a typical correspondence allows only about two unambiguous sensors to be reliably determined for each fiber because of spill over of the light from neighboring fibers. This result is understood when it is realized that even a coherent bundle of fibers would not necessarily have fibers neatly aligned in rows, nor would the fibers be evenly spaced, nor would the cut and polished output end of the bundle be optically flat or seat flat against the sensor array. With respect to this last-mentioned problem, the fibers may have a numerical aperture of, say 0.5. Consequently, if the bundle is not optically flat and against the array, spill-over occurs between the signals of neighboring fibers creating unwanted artifacts in an image gathered by the sensor array. The term "Spill-over" refers to the condition where light from neighboring fibers illuminate common sensors.

Figure 4:
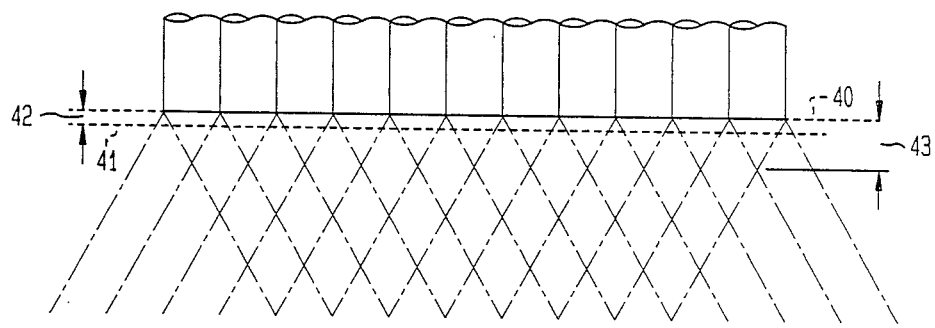
FIG. 4 is a schematic side view of the arrangement of FIG. 3 showing the relationship between the fiber output and the sensors of the array of FIG. 2.

FIG. 4 shows the spill-over effects. The exit end of the fiber bundle is represented as line 40, the fibers extending upwardly from line 40 as viewed. The sensors are positioned in a plane represented by broken line 41. It is clear that the separation 42 between the end of the fiber bundle and the sensor plane is advantageously less than the distance 43, which equals the image spread of the fibers, in order to avoid having light from more than one fiber illuminate common sensors. The illumination of common sensors could occur even if the fiber bundle exit face is optically flat and parallel to the sensor plane. If the plane of the fiber end is not parallel to the sensor array, spill-over could occur only at some portions of the sensor array.

Figure 5:
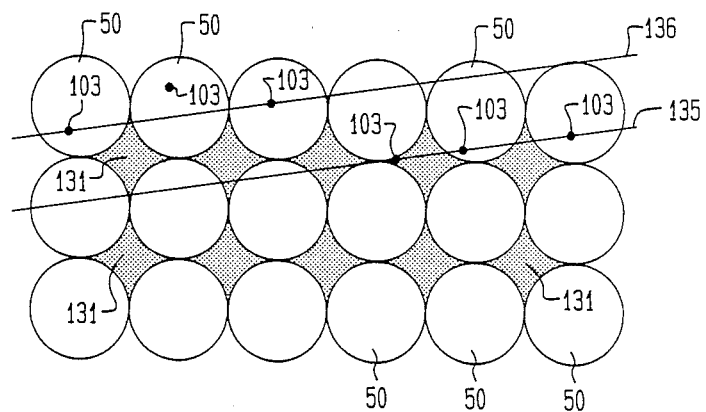
FIG. 5 is a schematic view of a fragment of a fiber optic bundle of FIG. 1 showing an end view of a plurality of fibers with sensor positions super-imposed thereon.

FIG. 5 shows a regular pattern of fibers 50. Such a pattern superimposed over the regular pattern of the sensor array (see FIG. 3) leads to Moire patterns and to aliasing. Such effects lead to artifacts in the electronically generated image in a well understood manner. Clearly, anything less than matching fiber diameter with sensor size and the attachment of such a fiber in a coherent bundle to a corresponding sensor of an array can result in image degradation and artifacts which are eliminated only at great cost. Arrangements which meet such exacting requirements are used commercially in, for example, engineering drawing scanners where the input end of the bundle is held in a linear array and the output end is precisely attached to the sensor array as described.

In accordance with the principles of the present invention coherent fiber optic bundles can provide an electronically digitized image when abutted or imaged onto a sensor array without any of the above-mentioned problems. The fiber bundle is merely attached to the surface of the sensor array, or imaged onto it, and then initialized to determine the sensors illuminated when a beam of light is directed into consecutive fibers of the input end of the bundle. The initializing procedure selects a subset of sensors of like sensitivity first and then selects one sensor from that subset for each fiber illuminated. The initializing procedure need only determine what sensor in the sensor plane is illuminated and, in effect, normalizes the system for any fiber-sensor mismatches of any kind thus eliminating any artifacts and aliasing effects.

Figure 6:
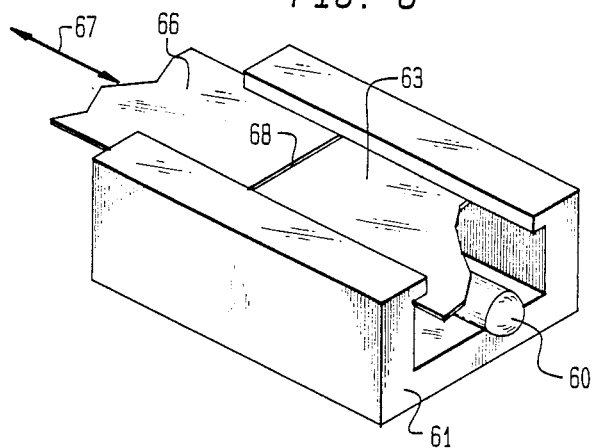
FIG. 6 is a schematic block diagram of an initializing arrangement for a one-dimensional fiber optic array.

FIG. 6 shows, schematically, the organization of an initializing arrangement in accordance with the principles of this invention. The arrangement is adapted for initializing of a fiber optic bundle having a linear input geometry useful for scanning a document at line-at-a-time as disclosed in the above-mentioned copending application.

Figure 7:
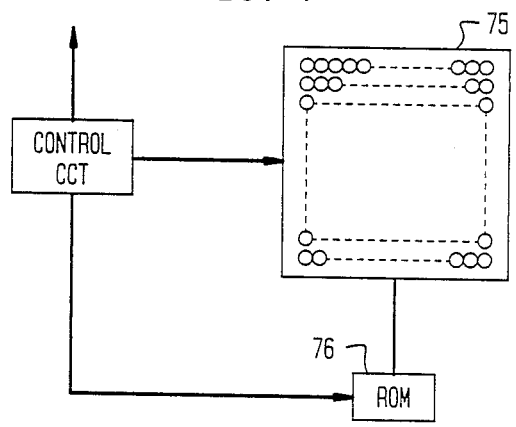
FIG. 7 is a schematic top view of a sensor array showing the positions of a cooperating coherent fiber optic bundle superimposed thereon.
Figure 8:
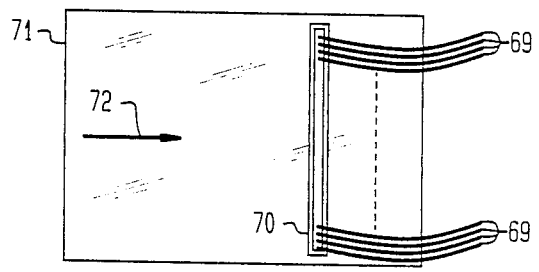
FIG. 8 is a perspective view of a portion of a document scanner cooperative with the sensor array of FIG. 7 in accordance with the principles of this invention.
Figure 9:
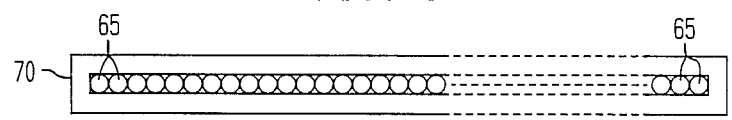
FIG. 9 is an end view of a linear end of a fiber array of the scanner of FIG. 8.

The initializing arrangement of FIG. 6 includes an optic RAM and a read-only memory (ROM) to sense and store the addresses of sensors activated when a light beam is moved incrementally along the linear end of the fiber optic bundle. FIG. 7 shows the optic RAM and the ROM organization. FIG. 8 shows the orientation of the linear end of a fiber optic bundle and FIG. 9 shows an end-on view of the fibers of FIG. 8. The initialization procedure is carried out by moving a relatively small diameter beam or slit of light incrementally along a path in the input face past each of the fiber ends of FIG. 9, in sequence, the beam being small compared to the fiber size.

The arrangement of FIG. 6 includes a light source 60 enclosed by a housing 61. A side 63 of housing 60 is placed adjacent to ends 65 of FIG. 9. Side 63 includes an opaque film or tape 66 which is moved along axis 67 represented by the double headed arrow so designated in FIG. 6. The tape includes a slit 68 having a width small compared to the diameter of a fiber and thus, when moved incrementally will at some positions illuminate the fibers of the linear array, one at a time. Software is adapted to store addresses of illuminated sensors when a maximum number of sensors in one area of the array is illuminated.

FIG. 8 represents the fibers as lines 69 extending from a ferrule 70. The ferrule is adapted to hold the linear end in an energy coupled relationship to a document to be copied. The document is represented by rectangle 71. In use, the document is moved in the direction of arrow 72 by means of a conventional paper moving apparatus as disclosed in my above-mentioned copending application. It is the fiber ends held by ferrule 70 which are positioned in the path along which light is moved and thus are illuminated, one by one, during the initializing procedure. The remote or exit end of the fiber bundle is gathered in a coherent or a non-coherent fashion, and abutted against (optical) RAM 75.

Figure 10:
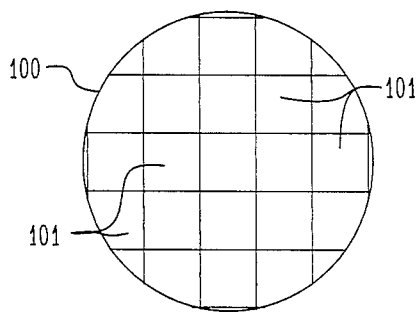
FIG. 10 is an enlarged schematic view of one fiber of the fiber array of FIG. 9 superimposed on a plurality of sensors of a cooperating sensor array.

FIG. 7 shows a sensor array 75 with a coherent arrangement of fibers superimposed on it. That is to say, the physical positions of the fibers at the linear end and the physical positions of the fibers at the remote end abutting array 75 are homologous. But the positions in the linear end are not predetermined nor are those positions prerecorded in the read only memory (ROM) 76 of FIG. 7. Instead, the initializing arrangement is operative to increment the slit 68 of FIG. 6 and to interrogate sensor array 75, in each instance, to determine which sensors are illuminated. The addresses of those sensors are stored in ROM 76 or in a look-up table on disk for later use, for example, for "burning" an EPROM (electrically programmable read only memory). In this connection, a typical fiber may overlay say twelve or sixteen sensors. This relationship is represented in FIG. 10 for a fiber 100, the sensors being represented by squares 101. The initializing arrangement, in this case, is adapted to record all the addresses of illuminated sensors each time the beam is incremented. When a maximum in the number of illuminated sensors occurs in one area of the array, that maximum or "blob" of sensor addresses is stored and one sensor from the blob is selected as representing an output position of a fiber. Thus, when fiber 100 is illuminated during an initializing operation one of the sensors (101) represents its output position.

The initializing arrangement is conveniently preprogrammed to illuminate the sensors of memory 75 (of FIG. 7) in sequence and to select all the sensors that have sensitivities which fall within a prescribed window (or windows). This procedure has been found to provide one or more sensors (a subset of the plurality of sensors illuminated) of like sensitivity for each fiber. The procedure is accomplished simply by illuminating the fibers for different prescribed periods of time and by recording the addresses of the illuminated sensors each time. The initializing procedure thereafter can be adapted to select one sensor of like sensitivity out of the twelve or so sensors illuminated for each fiber. The position of that sensor may vary with respect to the fiber end as represented by the black dots 103 of FIG. 5. Still, a clearer artifact-free image is produced by the resulting arrangement. Also of importance, since only one (or a few) of the many sensors illuminated by each fiber is interrogated, the speed at which the whole array if interrogated during each scan period is vastly increased.

A Personal Computer is useful for controlling the initializing procedure. Software is provided for determining the occurrence of a maximum number of illuminated sensors, a "blob", by comparing the number of illuminated sensors to the number illuminated for the preceding beam position and for ensuring that the center of the blob is at least two sensors away from the previous center. A flow diagram for the software is as follows:

The procedure starts with the gathering of the background noise from the sensor when it is not illuminated as indicated in the top of box, B1, of the flow diagram. This step permits us to subtract, for example, bad sensors which always indicate an illuminated condition.

The next box, B2, is directed at determining if an entire scan line (or operation) is completed. If yes, the blob data file is closed and we exit the program as indicated in box B3. If no, a next scan period occurs—the equivalent of snapping the next picture as indicated in box B4.

Box B5 indicates that the initialized beam is stepped and box B6 indicates that the background is stripped away. These steps provide the addresses of sensors illuminated by the beam. Boxes B7 and B8 represents the procedure for finding a maximum number (or blob) of illuminated sensors in one area of the array. If a blob is not found we return to block B2. If a blob is found, we determine its distance from the previous blob as indicated in box B9. If the blob is not more than two pixels or sensors away from the preceding blob, we determine if the new blob is bigger as indicated in box B10. If it is not, we return to box B2. If it is, we save the blob in a temporary register as indicated in box B11 and then we return to Box B2.

If the new blob was more than two pixels away from the previous one, we have a new blob. We save the new blob in a temporary register and stove the old blob in a blob data file as indicated in box B13 and return to box B2.

Figure 11:
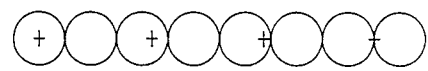
FIG. 11 is an enlarged schematic end view of a portion of a fiber optic bundle with selected associated sensors of a cooperating sensor array.

FIG. 11 illustrates the case where the fiber diameter is small compared to the spacing between sensors, representing the sensors as plus signs to emphasize the separation between sensors. It may be convenient, in this case, to employ a lens to image the output end of the fiber bundle onto the sensor array to achieve the relationship of FIG. 10. But a lens is an expense and results in a considerable loss of light. This may be tolerable, but must be considered in the design of the system.

If it is undesirable to use a lens, the initializing arrangement is operative in any case to select only those fibers which do in fact illuminate a sensor. The remaining fibers (i.e. broken or misplaced or superfluous fibers) are not used. As long as the selected fibers provide an acceptable resolution, the fiber bundle is useful and free of artifacts.

The foregoing discussion was directed an initializing a fiber bundle which has a linear organization at the input end. For industrial or medical scope uses, both ends of the fiber bundle are two dimensional. That is to say, both the input and output ends of the fiber bundle are, for example, circular as shown in FIG. 1.

Figure 12:
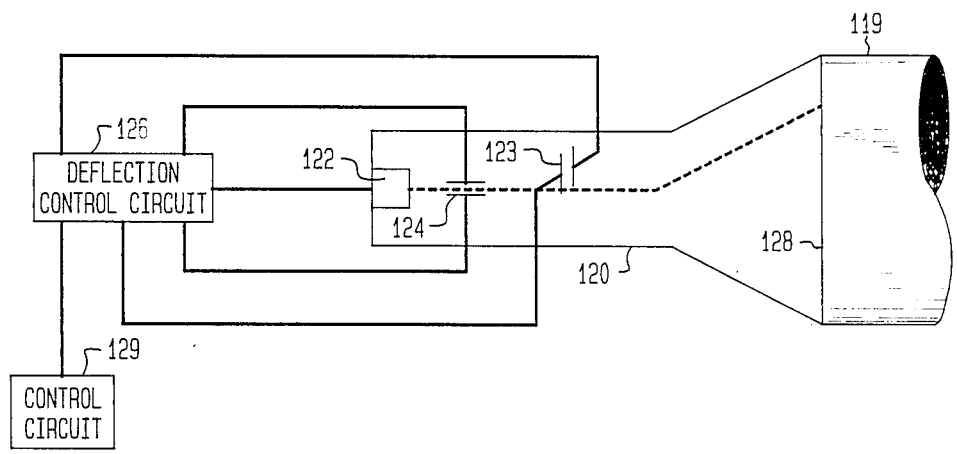
FIG. 12 is a schematic block diagram of an initializing arrangement for a two-dimensional fiber optic array useful with the scope of FIG. 1.
Figure 13:
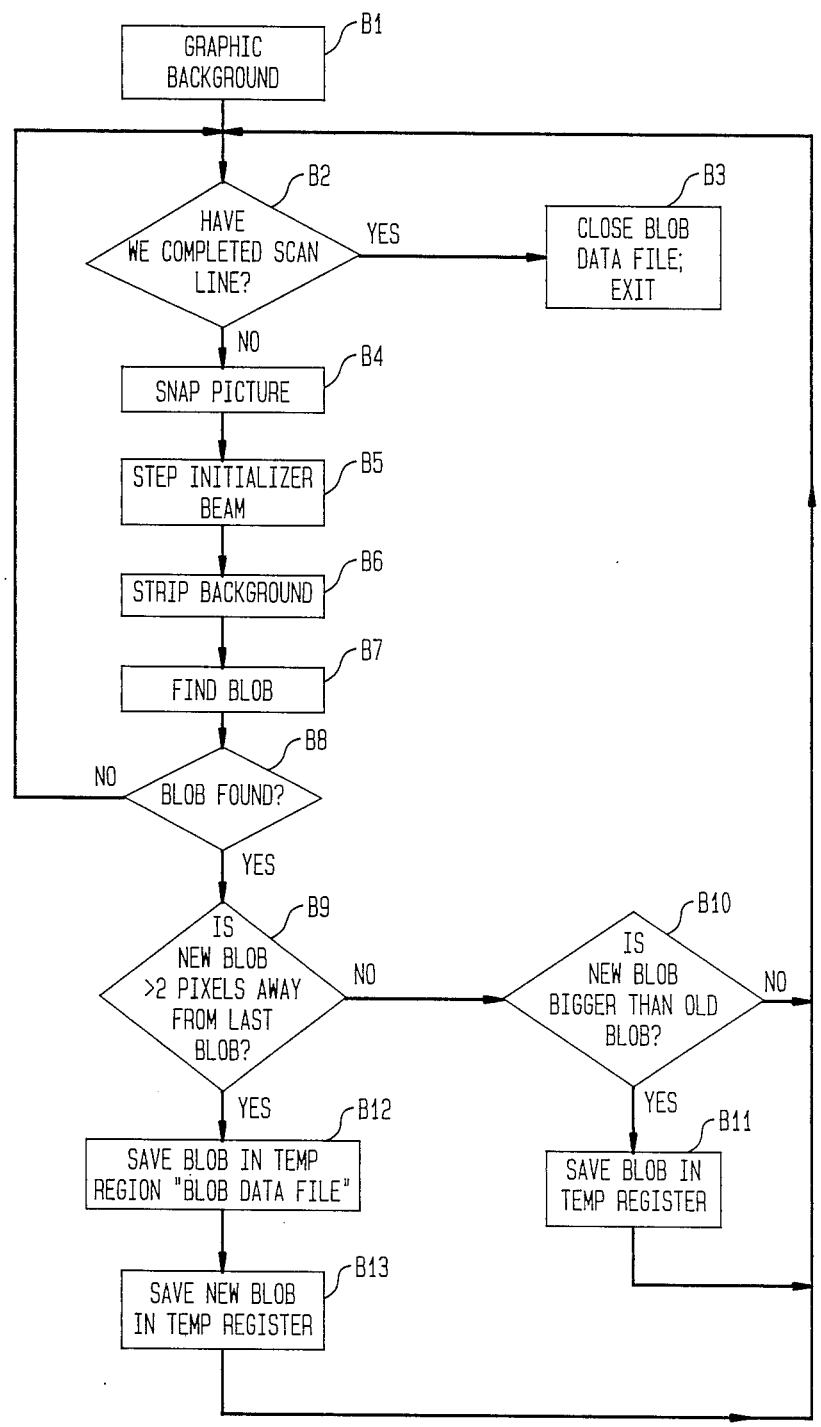
FIG. 13 is a flow diagram which shows how the scanner is initialized.

FIG. 12 is a schematic block diagram of an arrangement adapted to initialize a two dimensional array of fiber ends as shown in FIG. 1 or FIG. 5. It is, of course, important to illuminate a selected (single) fiber-at-a-time during the initialization operation. There may be over four thousand fibers in a linear array as shown in FIG. 9. Moreover, each of those fibers has a diameter of two mils (50 microns) or less. In a high resolution scope, there may be ten thousand fibers or more and each fiber may have a diameter of fifteen microns or less. The initializing procedure is not trivial. But it can be accomplished by a procedure similar to that of the organization of the printer arrangement disclosed in the above-mentioned copending application. FIG. 12 shows such an arrangement. Simply put, the input end of a bundle of fibers 119 organized in some two-dimensional geometry, typically circular, is abutted against, or imaged from the face of a cathode ray tube (CRT). The CRT is capable of directing an electron beam to any one of hundreds of thousands of points on the face of the CRT, many times the number of fibers used in commercially available fiber scopes. The CRT is designated 120 in FIG. 12 and includes a cathode 122 for generating electrons. The x and y deflection plates common to such tubes are designated 123 and 124 respectively. The deflection plates are operative in response to voltages applied by deflection control circuit 126. Normal raster scan operation for such a tube proceeds from side to side on faceplate 128 and then increments to the next line for repeating the operation until the entire faceplate is scanned. The presence of a beam of electrons in each position causes phosphors on the inside of the faceplate to emit light. Alternatively, a CRT of different construction permits the electron beam to be vectored to positions in any specified sequence. Operation is under control of control circuit 129. Light exiting to a fiber in a position corresponding to excited phosphors impinges on sensors as was the case with the initialization of a linear array.

The initializing operation merely relates the position of the electron beam to the address of a sensor or sensors illuminated for each position of the beam. It is not necessary to direct the beam at a specific fiber end to accomplish this task. It is only necessary to increment the beam along its path and to record the addresses illuminated in each position. The beam is moved in increments smaller than a fiber diameter and the beam size is made small compared to a fiber diameter. Consequently, at least one or more addresses can be determined from a sufficient number of beam positions to provide virtually any required resolution.

Once again, because the initializing procedure selects one beam position for one (or more sensors), it thus can select one fiber for each such position also. Consequently, the resulting system avoids the possibility of two separate patterns (fibers and sensors) which could lead to Moire patterns or to aliasing when signals are applied during operation. Moreover, mismatch between fiber size and/or location and sensor size and/or location, or the presence of voids, such as voids 131 of FIG. 5, cause only negligible problems if any. Further, the misalignment of fiber rows and sensor rows which could lead to artifacts in prior art systems can be corrected during the initializing operation. For example, such a misalignment could lead to a step in a straight line in an image being digitized by a scope, where no step actually exists. The step would occur because at some point along the line, the image would appear to correspond to the sensors of a next adjacent row. This is illustrated in FIG. 5 by straight lines 135 and 136. Consider rows of sensors aligned with lines 135 and 136. An image of a straight line produced by fibers 50 of the top row of fibers as received will be recorded as a stepped line, the portion of the image corresponding to the three fibers of the top row to the left as viewed corresponding to sensors along line 136, the three to the right corresponding to sensors of line 135. The resulting image artifact is eliminated during the initialization operation herein.

In fact, because the sensor array is a sensor and the fiber bundle transmits points of light, the output of the sensor array can be viewed via a monitor during manufacture so that the process of attaching the fibers to the sensor array can itself be used to avoid misalignment of the type described, a procedure which suggests its use as a positioning device for industrial use. When the fiber bundle comprises a number of finger-like bundles, the arrangement can be used in a mechanical manipulator such as a robotic hand, to position objects and to observe the movement in detail. All the fiber bundles of a group of manipulator "fingers" can be attached to a single sensor array in the "palm of the hand", providing a simple "sighted tool".

Thus, it should be clear that even a coherent fiber optic bundle has problems which cannot be corrected easily in the absence of an initialization procedure disclosed herein. Of course, the procedure is usable with a non-coherent fiber optic bundle as disclosed in the above-mentioned copending application also.

A system or combination of elements herein includes a coherent (or a partially coherent or non-coherent) fiber optic bundle, a cooperating sensor array and means for interrogating the subset of addresses in the sensor array generated during the initializing procedure. The means for interrogating for example, conveniently comprises a read only memory 143 programmed accordingly to interrogate only the selected sensors of the array, in the address sequence obtained during initialization, each time a scan period occurs. A scan period occurs when, for example, light from light source 140 of FIG. 1 is incident on an object and the sensor array 141 is interrogated under the control of controller 142. It is convenient to strobe light source 140 and to activate imaging means 141, when desired, in synchronism with the strobe. The pixels sensed during each scan period are stored in a memory for processing under the control of controller 142 as disclosed in my above-mentioned copending application.

What is claimed is:

1. A combination of elements for controllably activating a unique subset of sensors in a sensor array during a scan period when an object is illuminated, said combination comprising a sensor array and a coherent fiber optic bundle adapted to direct light representative of said object onto said array, said combination including permanent memory means for storing the addresses of said unique subset of sensors determined during an initialization procedure, and means for interrogating said unique subset of sensors of said array in a manner to provide the correspondence between each fiber and at least one associated sensor each time a scan period occurs.

2. A combination in accordance with claim 1 wherein said subset comprises a single sensor for each of said fibers.

3. A combination in accordance with claim 1 wherein a pixel formed from each of said fibers covers an area of said sensor array which includes a plurality of sensors.

4. A combination in accordance with claim 3 wherein the output end of said fiber bundle is attached to said sensor array.

5. A combination in accordance with claim 3 also including a lens, said lens being adapted to focus the pixels from the output end of said fiber optic bundle onto said sensor array.

6. A combination in accordance with claim 3 wherein each of said fibers has a diameter large compared to a sensor of said sensor array, and said sensors are closely spaced such that each of said fibers corresponds to a plurality of said sensors.

7. A combination in accordance with claim 6 also including means for selecting one or more of said plurality of sensors which corresponds to each of said fibers.

8. A combination in accordance with claim 7 also including means for deselecting the remaining ones of said plurality of sensors which corresponds to each of said fibers.

9. A combination in accordance with claim 5 wherein the diameter of each of said fibers is less than about the size of one of said sensors, and, neighboring ones of said fibers are spaced apart distances small compared to the spacing between neighboring ones of said sensors.

10. An electronic imaging arrangement, comprising an at least partially coherent optical fiber bundle having input and output faces, said input end being adapted to accept light from an object, said output end being adapted to apply pixels representative of said object to a sensor array, said pixels formed by said fiber bundle, means for illuminating said object and means for interrogating a unique subset of sensors in said sensor array when said object is illuminated, said unique subset of sensors being determined during an initialization procedure during which a beam of light is moved incrementally along a path in said input face in a manner to intersect the input ends of the fibers in said bundle in succession and the addresses of the sensors illuminated in each instance are recorded for determining said subset, said beam of light having a diameter small compared to a fiber diameter.

11. A method for determining the relationship between the fibers of a fiber optic bundle having an input and an output face and the sensors of a sensor array onto which the bundle is operative to direct an array of pixels, said method comprising the steps of positioning said bundle such that the pixels exiting said output face of said bundle impinge upon the surface of said array, moving a beam of radiation of relatively small diameter incrementally along a path in said input face which intersects said fibers in an ordered sequence, each of said fibers having a relatively large diameter, interrogating said array in a manner to determine which sensors of said array are illuminated each time said beam is moved along said path, and storing the addresses of the sensors illuminated each time a maximum in the number of illuminated sensors in one area of said array occurs.

12. A method in accordance with claim 11 also including the steps of selecting the addresses of a single sensor in each of said maximum number of sensors for forming a subject of addresses.

13. A method in accordance with claim 11 wherein said fiber optic bundle is at least partially coherent.

14. A method in accordance with claim 12 also including the step of programming a ROM to store the addresses of said unique subset of sensors.

15. A method in accordance with claim 14 also including the step of selecting the sensors of said array which have sensitivities which fall within a prescribed range of sensitivities.

16. Apparatus for initializing a fiber optic bundle, said apparatus including means of moving a relatively small beam of light incrementally along a path which intersects the input ends of the fibers of said bundle, an electronic sensor array energy coupled to the output face of said bundle and including a plurality of sensors for each of said fibers, memory means for storing the addresses of said sensors each time said beam is moved, means for determining the occurrence of a maximum number of illuminated sensors in one area of said array, means for selecting at least a single address from each of said maximum number and means for forming a subset of addresses including each of said single addresses.

17. Apparatus in accordance with claim 16 also including means for selecting sensors of said array which have sensitivities which fall within a prescribed range of sensitivities.

* * * * *